Aug. 17, 1965 W. OLSEN ETAL 3,201,732

WOUND MAGNETIC CORE HAVING TURNS WHICH ARE GIVEN A PREDETERMINED SET IN RADIUS BEFORE WINDING

Original Filed Sept. 25, 1959 6 Sheets-Sheet 2

Aug. 17, 1965 W. OLSEN ETAL 3,201,732

WOUND MAGNETIC CORE HAVING TURNS WHICH ARE GIVEN A PREDETERMINED SET IN RADIUS BEFORE WINDING

Original Filed Sept. 25, 1959 6 Sheets-Sheet 3

Aug. 17, 1965 W. OLSEN ETAL 3,201,732

WOUND MAGNETIC CORE HAVING TURNS WHICH ARE GIVEN A PREDETERMINED SET IN RADIUS BEFORE WINDING

Original Filed Sept. 25, 1959 6 Sheets-Sheet 4

Aug. 17, 1965 W. OLSEN ETAL 3,201,732

WOUND MAGNETIC CORE HAVING TURNS WHICH ARE GIVEN A PREDETERMINED SET IN RADIUS BEFORE WINDING

Original Filed Sept. 25, 1959

6 Sheets-Sheet 5

United States Patent Office 3,201,732
Patented Aug. 17, 1965

3,201,732

WOUND MAGNETIC CORE HAVING TURNS WHICH ARE GIVEN A PREDETERMINED SET IN RADIUS BEFORE WINDING

Willy Olsen, Lynchburg, Va., and Belvin B. Ellis, Pulaski, Pa., assignors to Westinghouse Electric Corporation, East Pittsburgh, Pa., a corporation of Pennsylvania Original application Sept. 25, 1959, Ser. No. 842,295, now Patent No. 3,081,962, dated Mar. 19, 1963. Divided and this application July 20, 1961, Ser. No. 125,482
1 Claim. (Cl. 336—213)

This application is a division of the applicants' parent application filed September 25, 1959, Serial No. 842,295, Patent No. 3,081,962 and assigned to the same assignee as the present application.

This invention relates to wound magnetic cores for induction apparatus, such as transformers, and to a method and apparatus for manufacturing magnetic cores of the wound type.

In the manufacture of certain types of wound magnetic cores, such as disclosed in copending application Serial No. 702,096, filed December 11, 1957 by B. B. Ellis, Patent No. 3,154,758, and assigned to the same assignee as the present application, a plurality of turns of magnetic strip material is first wound to form a generally ring-shaped, closed core loop. The core loop thus formed may then be annealed before subsequent operations performed on said core loop in order that the core loop will retain its shape during or after one or more subsequent operations performed on said core loop in the manufacture of a finished wound core. The latter annealing operation, where employed, has the disadvantage that it may adversely affect the magnetic properties of the magnetic strip material from which the core loop is formed, particularly where the strip material has at least one preferred direction of orientation.

In certain applications of wound magnetic cores, it is also desirable that a core loop, formed as just described, have a substantially uniform space factor or looseness in order to facilitate the performance of certain subsequent operations on said core loop or in order to facilitate the assembly of the finished wound core with electrical windings in an overall core and coil assembly in an inductive apparatus, such as a transformer. One conventional method which is employed to obtain a substantially uniform space factor in a magnetic core loop of the type described is to control or regulate the tension of the magnetic strip material during the initial winding of the core loop. The latter method has the disadvantages that it is rather complex and that the space factor may deviate from the desired predetermined value due to variations in the flatness or waviness of the magnetic strip material from which the core loop is formed. It is therefore desirable to provide an apparatus and a method for the manufacture of wound magnetic cores in which at least one annealing operation is eliminated following the initial winding of a core loop and in which a substantially uniform space factor is obtained by a method which is much simpler than the conventional methods employed for the latter purpose.

It is an object of this invention to provide a new and improved apparatus and method for winding magnetic core loop structures from magnetic strip material.

Another object of this invention is to provide a new and improved apparatus and method for winding magnetic cores having a substantially uniform space factor from magnetic strip material.

A further object of this invention is to provide a new and improved apparatus and method for winding a closed magnetic core loop having a generally ring-shaped configuration from magnetic strip material which is arranged to retain its shape and size after winding.

A still further object of this invention is to provide an apparatus and a method for winding a closed magnetic core loop having a generally ring-shaped configuration in which the method eliminates at least one heretofore necessary subsequent step or operation in producing certain types of wound magnetic cores.

A final object of this invention is to provide a new and improved generally ring-shaped magnetic core loop including a plurality of turns of magnetic strip material.

Other objects of the invention will in part be obvious and will in part appear hereinafter.

The invention accordingly comprises the several steps and the relation and order of one or more of such steps with respect to each of the others, the apparatus embodying the features of construction, combinations and arrangements of parts adapted to effect such steps, and the wound magnetic core which possesses the characteristics, properties and relation of elements, all as exemplified in the detailed disclosure hereinafter set forth and the scope of the application of which will be indicated in the claims.

For a fuller understanding of the nature and objects of the invention, reference should be had to the following detailed description taken in connection with the accompanying drawings in which.

Figure 1:
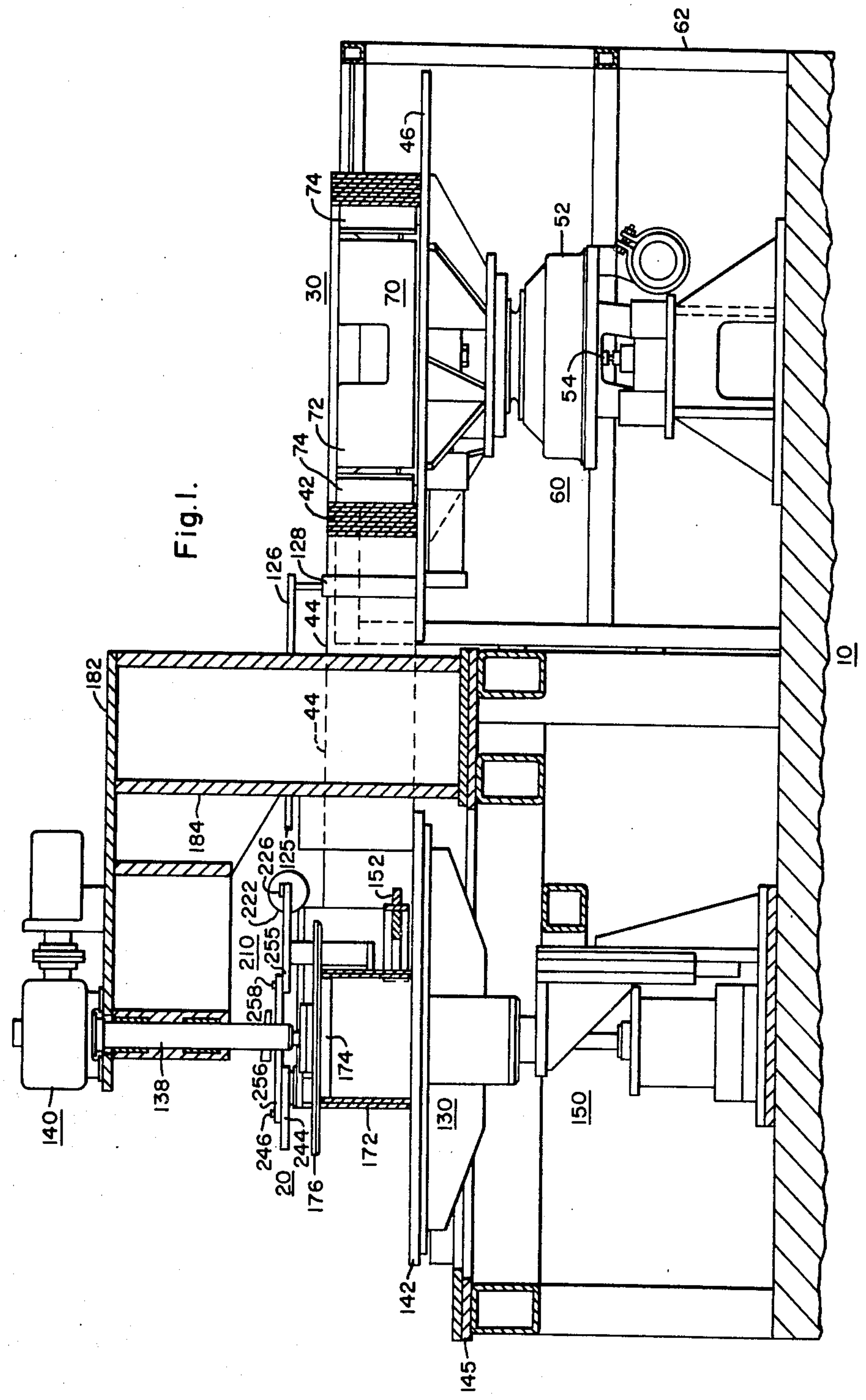
FIGURE 1 is a partial side elevational view in section taken on the line I—I of FIG. 2 of a machine or apparatus constructed in accordance with the invention.
Figure 2:
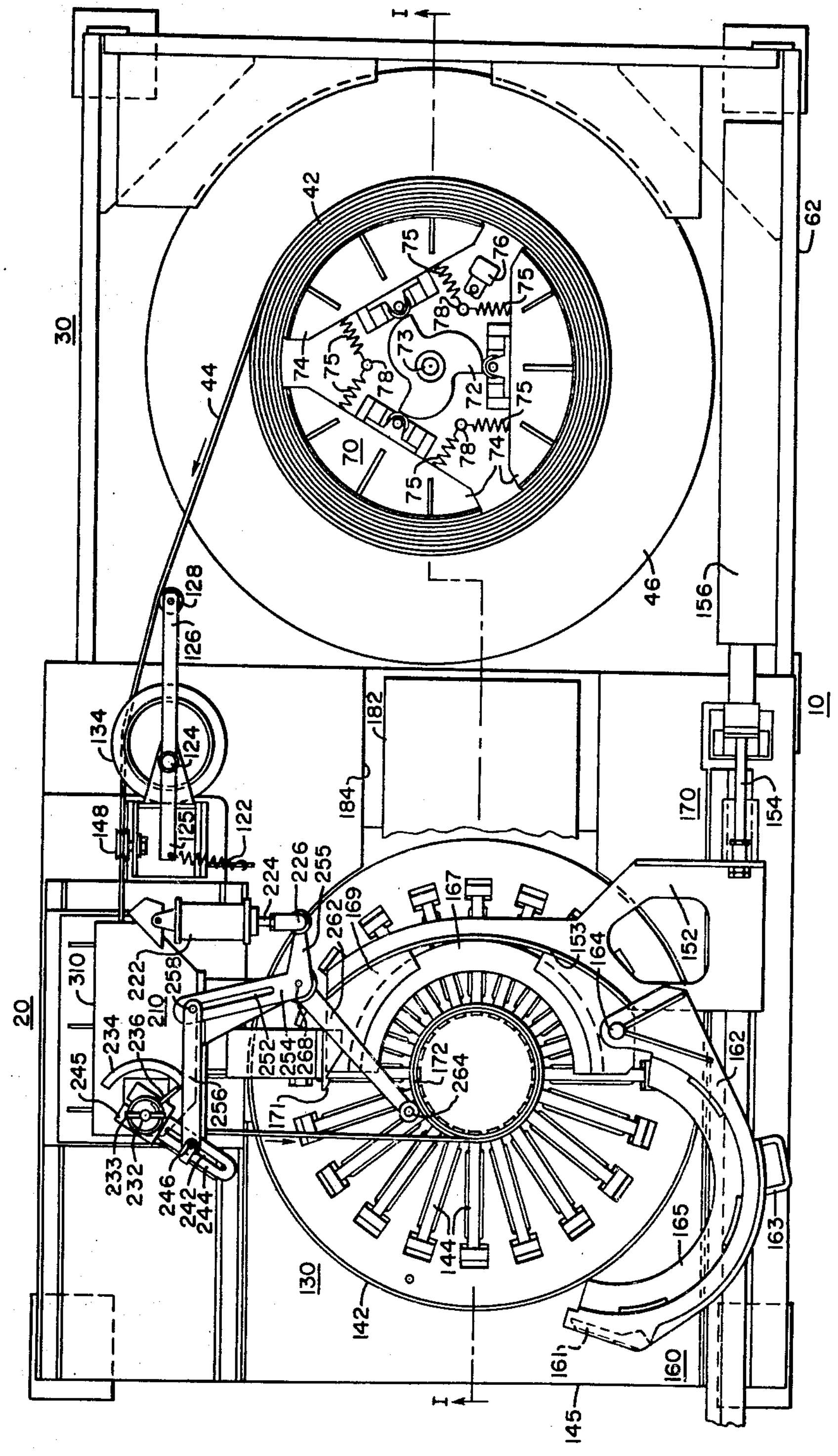
FIG. 2 is a top plan view, partly in section, of the apparatus shown in FIG. 1.

Referring now to the drawings and particularly to FIGS. 1 and 2, there is illustrated an apparatus or machine 10 for producing a generally ring-shaped, closed magnetic core loop in accordance with the teachings of this invention. Broadly, the apparatus 10 comprises the strip feeding or supplying means 30 for supplying a continuous strip or ribbon of magnetic strip material, such as magnetic steel that is slit or cut to the proper width, and the winding or coiling means 20 which cooperates with the strip feeding means 30 to coil or wrap a plurality of turns of the magnetic strip material around a rotatable member to form a closed magnetic core loop having a generally ring-shaped or hollow cylindrical configuration.

In particular, the strip feeding means 30 includes a turntable 46 which is rotatably supported by the frame section 62, as best shown in FIG. 1. The turntable 46 carries or supports a supply coil or roll 42 which includes a plurality of turns of the magnetic strip material 44 and from which the strip material 44 is uncoiled and wound on a rotatable member by the winding means 20, as will be explained hereinafter. In order that the coil or roll 42 rotate with the turntable 46 during the operation of the apparatus 10, the turntable 46 is provided with a collapsible mandrel 70 which is positioned inside the coil or roll 42 and secured by suitable means to said turntable. It should be noted that both the coil or roll 42 and the turntable 46 are arranged to rotate about substantially vertical central axes.

More specifically, the collapsible mandrel 70 comprises a plurality of shoes or segments 74 having outer curved surfaces which each normally bear against a portion of the coil or roll 42 at its inner circumference or periphery. The shoes or segments 74 are arranged for reciprocal movement radially of the central axis of the turntable 46 by any suitable means and biased inwardly towards said central axis by the compression springs 75, which are each secured at one end to one of the shoes 74 and at the other end to one of the vertical posts 78, which in turn are secured to or formed integrally with the turntable 46. The collapsible mandrel 70 also includes a control cam 72 having a plurality of projections, each of which bears against the inner surface of one of the shoes 74 and, in the position of the cam 72 shown in FIG. 2, causes each of said shoes to bear against the inner surface of the coil or roll at its inner circumference or periphery. The position of the cam 72 is controlled in turn by the rotation of the camshaft 73 to which the cam 72 is attached or secured. The control handle 76 may be provided to control the condition or position of the collapsible mandrel 70 by actuating or rotating the camshaft 73 through suitable hydraulic or pneumatic means (not shown). For example, the collapsible mandrel 70 may be collapsed by rotating the camshaft 73 and the control cam 72 in a clockwise direction from the position shown in FIG. 2 to permit the compression spring 75 to actuate or move the shoes 74 inwardly towards the central axis of the turntable 46 until the shoes 74 are no longer in contact with the inner surface of the coil or roll 42. The latter operation may be employed when a new coil or roll 42 is to be loaded or placed on the turntable 46.

In order to assist in controlling the tension of the magnetic strip material 44 as it is unwound from the coil or roll 42 by the winding means 20, the strip feeding means 30 also includes a braking means 60 which in this instance is disposed or positioned beneath the turntable 46. The braking means may be of any conventional suitable type, such as the automotive type, and, as illustrated, includes a brake drum 52 which is mounted or attached to a lower extending shaft portion 54 of the turntable 46. The operation of the braking means 60 may be controlled by any suitable hydraulic or electrical means (not shown in detail).

It should be noted that the turntable 46 taken together with the collapsible mandrel 70 comprise a supply or reel member which is subject to braking by the braking means 60, when the collapsible mandrel 70 is in the position or condition shown in FIG. 2 and the coil or roll 42 is rotating with the turntable 46 during the operation of the apparatus 10. As indicated previously, the braking means 60 is provided to transmit a braking torque to the turntable 46 through the brake drum 52 and in turn to the coil or roll 42 during the latter assumed operating condition.

Figures 5, 6:
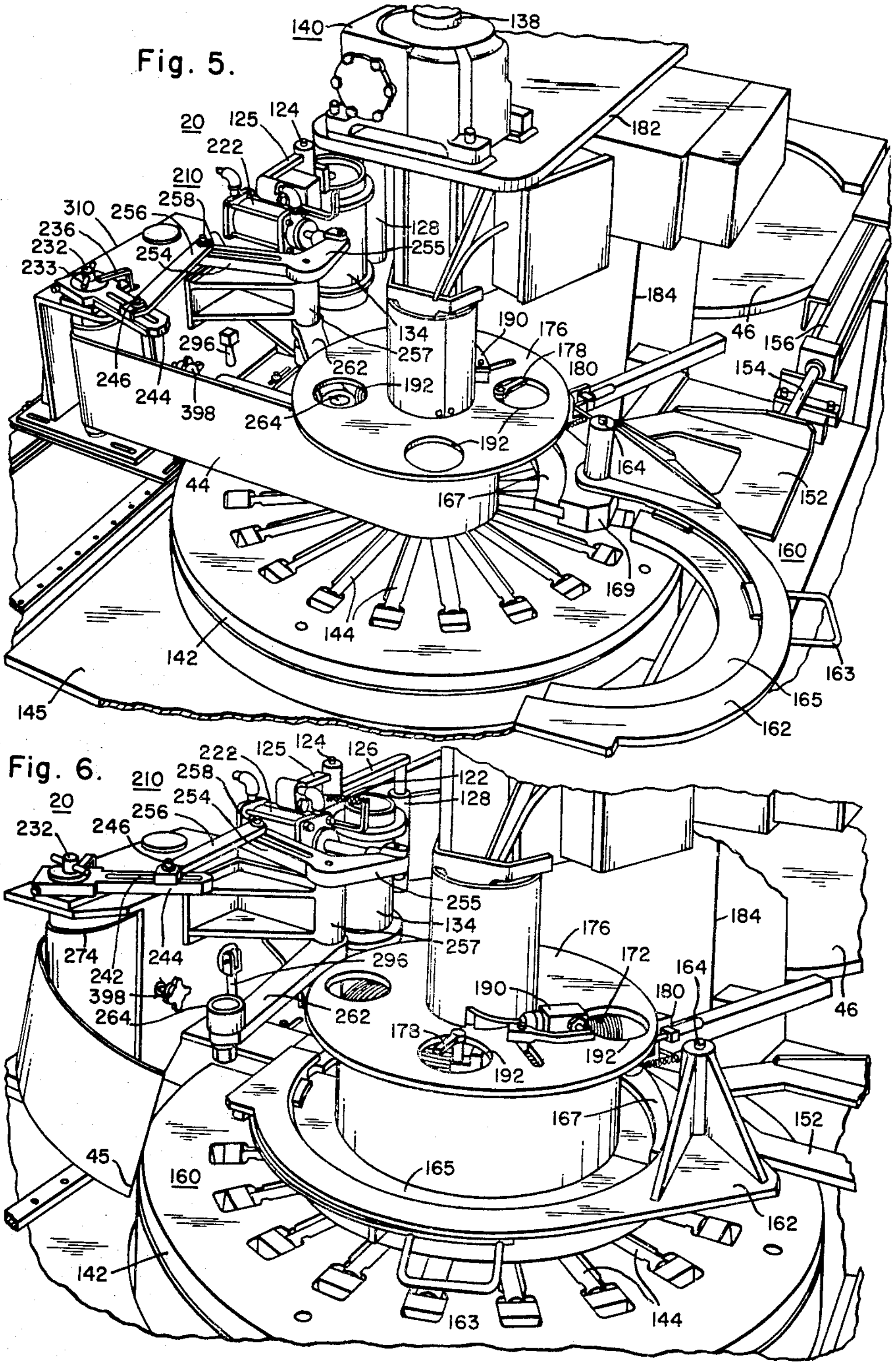
FIGS. 5 and 6 are partial perspective views of the apparatus shown in FIG. 1, illustrating its operation at different times.

Referring now to FIGS. 1, 2, 5 and 6, the winding means 20 includes a rotatable member, more specifically the mandrel 174, on which a plurality of turns of the magnetic strip material 44 may be wound to form a closed magnetic core loop, as indicated at 172, having a generally ring-shaped or hollow cylindrical configuration. The mandrel 174 is attached to and rotates with a drive shaft 138 which in turn is mechanically coupled to a driving means 140, which may be of any suitable electrical, hydraulic or pneumatic type, such as an electric or hydraulic motor. The driving means 140 in this instance is supported on the horizontal surface of an upper frame portion or section 182, which is supported in turn by an intermediate frame portion 184. The intermediate frame portion 184 is supported in turn by the lower frame portion 145, as best shown in FIGS. 1 and 5.

More specifically, the mandrel 174 includes an upper flanged portion 176 having a plurality of openings or apertures 192 therein, through which the build-up of the turns of the strip material 44 may be observed by the operator of the apparatus 10 as the turns of the strip material 44 are wound around the mandrel 174. The mandrel 174 also includes a slot (not shown) into which the free end of the strip material 44 may be inserted when the winding of a core loop is started and the free end of the strip material 44 may then be secured to the mandrel 174 by turning the rotatable clamping handle 178 which is provided on the mandrel 174 and which is accessible through one of the openings 192, as best shown in FIGS. 5 and 6. It is clear that other suitable means may be employed to secure the free end of the strip material 44 to the mandrel 174 when the winding of a core loop is started.

The winding means 20 also includes a winding table 130 having a substantially flat upper surface 142 which is generally circular in shape and which is disposed in a substantially horizontal plane. The winding table 130 is supported by the lower frame portion 145 and is arranged for reciprocal movement vertically with respect to the lower frame portion 145 and the mandrel 174 by suitable means, such as the hydraulic means 150, substantially parallel to or longitudinally of the central axis of the winding table 130 which is a vertical axis substantially perpendicular to the plane of the upper surface 142 of the winding table 130. The winding table 130 is also provided with a plurality of rolls 144 which are embedded or disposed in the upper surface 142 of the winding table 130 and arranged radially about the central axis of the winding table 130. The rolls 144 are adapted to freely rotate in place to permit the winding of the strip material 44 on the mandrel 174 without damage to the lower edge of the strip material 44 during winding but otherwise the rolls 144 do not move with respect to the winding table 130 and move vertically with the winding table 130 as it is raised or lowered vertically by the hydraulic means 150. It is to be noted that the winding table 130 when it is in the raised or upper position, as best shown in FIG. 1, during the winding of the wound core or core loop 172 supports or carries the weight of the core loop 172 and cooperates with the mandrel 174 and the upper flanged portion 176 thereof to form an effective winding reel on which the upper and lower edges of the strip material 44 are substantially aligned during the winding of the strip material 44 on the mandrel 174 to form the core loop 172. It is also to be noted that the central axis of the core loop 172 as it is wound about the mandrel 174 is substantially vertical.

It is to be understood that, in certain applications, a rotatable turntable without rollers embedded in the flat top surface thereof may be substituted for the winding table 130.

Figure 3:
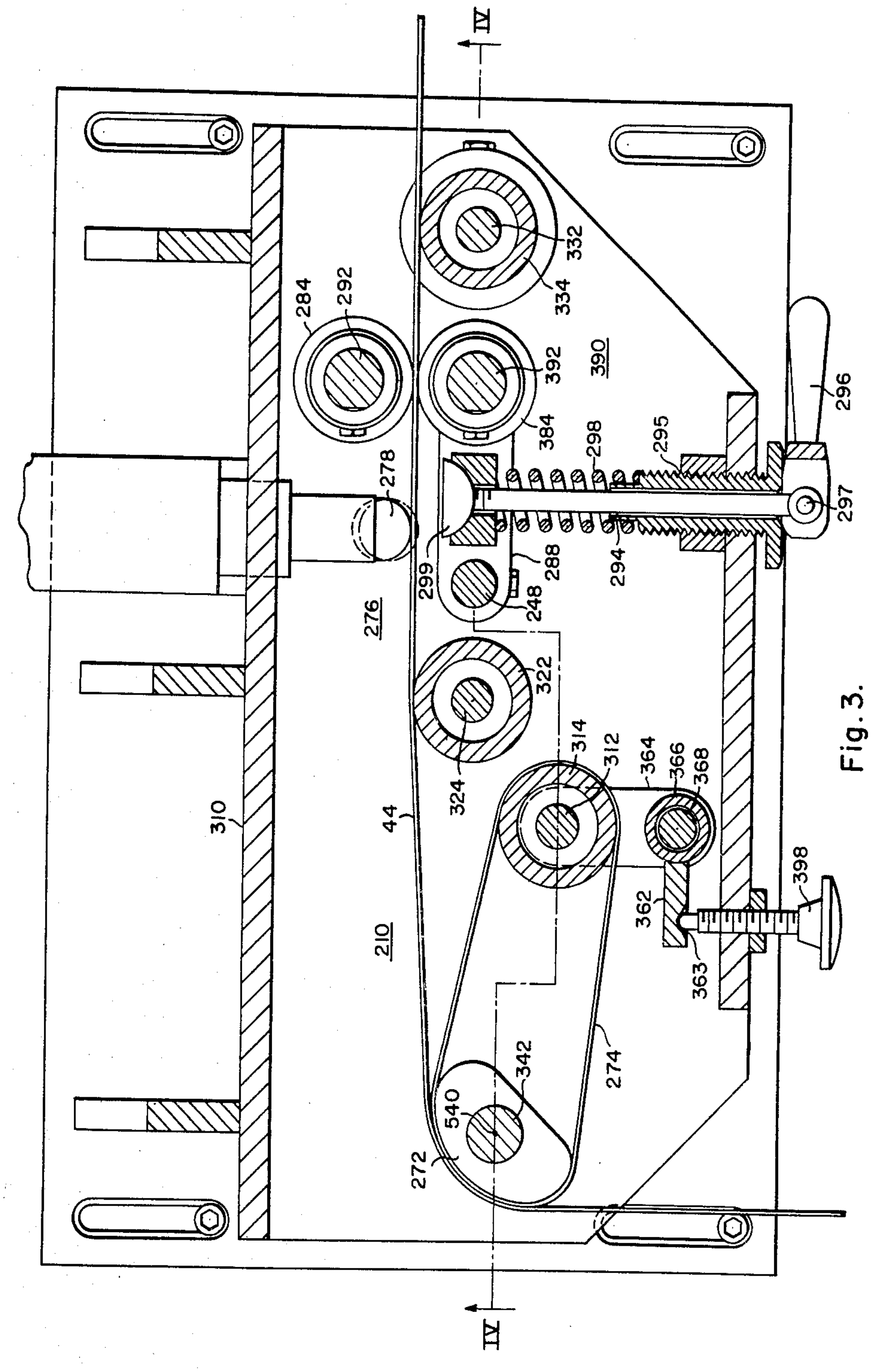
FIG. 3 is an enlarged top plan view, in section, of a part of FIG. 1.
Figure 4:
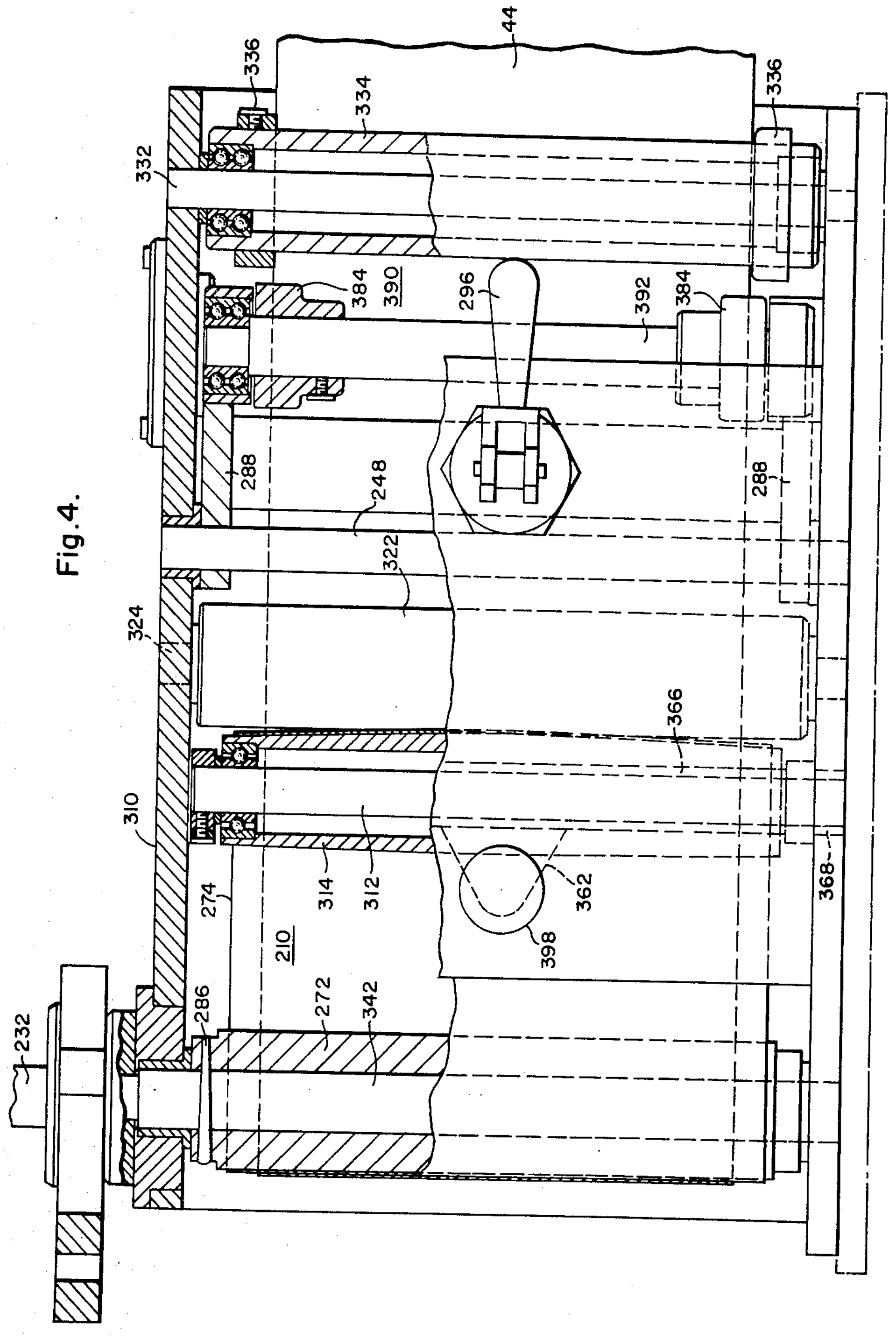
FIG. 4 is a side elevational view, partly in section taken on the line IV—IV of FIG. 3.

Referring again to the drawings and FIGS. 1, 2, 5 and 6 in particular, the winding means 20 also includes means for guiding the strip material 44 as it passes from the strip feeding means 30 to the mandrel 174. In particular, the guiding means includes the guide rolls 128, 134 and 148, as best shown in FIGS. 2 and 6. The movable guide roll 128 is pivotally secured or mounted on one end of the lever arm 126, which in turn is pivotally supported or mounted on the lower frame portion 145, as indicated at 124. The lever arm 126 includes an extending portion 125 whose outer end is secured to one end of the biasing spring 122 which biases the lever arm 126 to rotate in a counterclockwise direction about the pivot point 124 and causes the guide roll 128 to bear against the strip material 44 as it passes from the coil or roll 42 to the guide roll 134. The guide roll 128 also assists in maintaining the tension in the strip material 44 as it passes from the roll 42 to the guide roll 134. The stationary guide roll 134 is supported by the frame portion 145 and is adapted to rotate in place about a vertical axis. The guide roll 134 includes flanged portions or collars at the upper and lower ends thereof between which the strip material 44 passes and which serve to vertically position the strip material 44 before the strip material 44 passes between the following guide rolls 148. The guide rolls 148 are supported by the frame portion 145 and adapted to rotate in a plane which is substantially parallel to the plane of the strip material 44 as it passes therebetween. The guide rolls 148 are disposed above and below the strip material 44 and arranged to apply guiding forces to the upper and lower edges of the strip material 44 as it passes between the guide rolls 148 and to position the strip material 44 vertically before it passes into the housing 310. The guiding means included as part of the winding means 20 also includes the guide roll 334, which is supported by the frame portion 145 through the bearing pin 332 and is disposed inside the housing 310, as best shown in FIGS. 3 and 4. Similarly to the guide roll 134 the guide roll 334 is adapted to rotate in place about a vertical axis and includes upper and lower flanged portions or collars 336 which are also adapted to position the strip material 44 vertically as it passes over the guide roll 334.

Referring to FIGS. 3 and 4, the winding means 20 also includes a set of deburring rolls, indicated generally at 390. The set of deburring rolls 390 includes the stationary deburring rolls 284 which are disposed on one side of the strip material 44 and supported by the pin 292, which in turn is supported by the frame portion 145. The deburring rolls 284 are adapted to rotate in place with the pin 292 about a substantially vertical axis and take the form of upper and lower flanged portions or collars which are normally in contact with the upper and lower edges, respectively, of the strip material 44 as it passes by during its movement towards the mandrel 174. The set of deburring rolls 390 which is disposed inside the housing 310 also includes the movable deburring rolls 384 which are supported by the pin 392 at the upper and lower ends thereof, the pin 392 being supported in turn by the supporting member or lever arm 288. The supporting member 288 is supported in turn by the pin 248 which is mounted on the frame portion 145. The supporting member 288, as well as the movable deburring rolls 384 which are mounted thereon, is adapted to rotate about the pin 248 or about a vertical axis.

In order to maintain the movable deburring rolls 384 in contact with the side of the strip material 44 which is opposite to the side of the strip material 44 in contact with the stationary deburring rolls 284, a clamping means is provided which includes the movable handle 296, the connecting rod 294, which is pivotally connected to the handle 296 as indicated at 297, the hemispherical member 299 which is threadedly attached to the end of the connecting rod 294 away from the operating handle 296 and the compression spring 298. The connecting rod 294 passes through the wall of the housing 310 through a bushing or sleeve 294, the outside of said bushing being adapted to threadedly engage the wall of the housing 310, as best shown in FIG. 3. The hemispherical member 299 is adapted to be inserted in a matching recess in the supporting member 288 to mechanically connect or couple the connecting rod 294 to the supporting member 288. The compression spring 298 is disposed around the inner end of the connecting rod 294 between the supporting member 288 and a shoulder portion of the bushing 295 to bias the supporting member 288 to rotate in a counterclockwise direction about the pin 248 and to cause the movable deburring rolls 384 to bear against one side of the strip material 44 when the movable handle 294 is in the inward position shown in FIG. 3.

In order to release the clamping means which maintains the movable deburring rolls 384 in contact with the strip material 44, the movable handle 296 is rotated from the position shown in FIG. 3 approximately 90° in a clockwise direction. The portion of the operating handle 296 which is pivotally connected to the outer end of the connecting rod 294, as indicated at 297, is then adapted to actuate the connecting rod 294 in a direction which is away from the strip material 44, as illustrated in FIG. 3. The latter movement of the connecting rod 294 causes the supporting member 288 to rotate in a clockwise direction about the pin 248 and moves the movable deburring roll 384 correspondingly away from their normal contact with the strip material 44. The latter operation permits the threading of the strip material 44 through the set of deburring rolls 390 when a new roll or coil of strip material 42 is to be loaded in the strip feeding means 30.

It is to be noted that the upper and lower stationary and movable deburring rolls 284 and 384, respectively, extend beyond the upper and lower edges, respectively, of the strip material 44 so as to flatten out or remove any burrs which are encountered at the upper and lower edges of the strip material 44 as it passes said deburring rolls which might result from the prior slitting or cutting of said strip material to the proper width.

In order to detect the absence of tension in the strip material 44 after it passes through the set of deburring rolls 390 as just described, the microswitch assembly 276 is disposed adjacent to the set of deburring rolls 390 and is supported by the housing 310, as best shown in FIG. 3. The microswitch assembly 276 includes a projecting member 278 which normally bears against one side of the strip material 44, after it has passed through the set of deburring rolls 390, and contact means (not shown) which are actuated by the movement of the projecting member 278 whenever the tension in the strip material 44 decreases below a predetermined value to thereby actuate or control the operation of the driving means 140 through suitable control means (not shown) and remove the driving torque from the shaft 138 and the mandrel 174. The latter safety feature would be of particular importance if the strip material 44 should rupture or tear during the winding of the core loop 172 on the mandrel 174.

Referring to FIGS. 2, 3 and 4, the winding means 20 also includes the bending or shaping means 210 which is interposed between the set of deburring rolls 390 and the mandrel 174 for imparting or introducing a predetermined curvature or set into the strip material 44 before it is wound on the mandrel 174. In general, the bending or shaping means 210 is provided in order to introduce or impart a set or curvature into the strip material 44 having an effective bend radius or radius of curvature less than the effective radius of the corresponding turn of the strip material 44, as it is wound on the mandrel 174 to form a core loop 172, and which varies continuously with the build-up or number of turns during the winding of the core loop 172.

Figure 7:
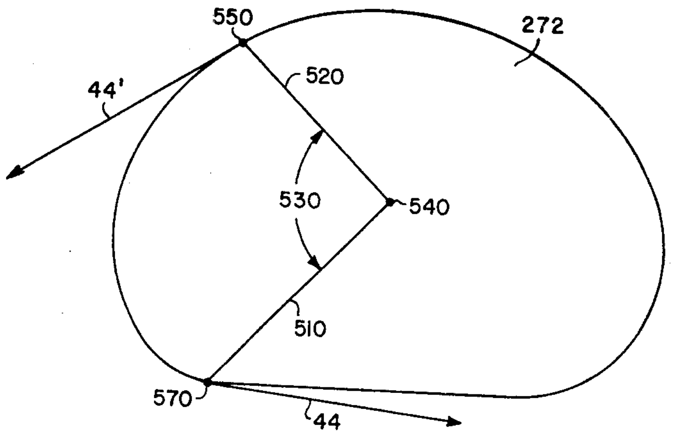
FIG. 7 is an enlarged view of a part of the apparatus shown in FIGS. 1 and 2.

In particular, the bending or shaping means 210 includes a generally cylindrical shaping or bending cam 272 which is supported by and mounted on the bearing pin 342, which in turn is supported by the housing 310. The bending or shaping cam 272 is generally elliptically-shaped or oval-shaped in configuration or cross section, as shown in FIGS. 3 and 7. A predetermined curvature or set is introduced into the strip material 44 as it passes or is drawn over the curved surface of the shaping or bending cam 272 by the mandrel 174.

In order to reduce the wear on the bending or shaping cam 272 as the strip material 44 passes over the surface of the shaping or bending cam 272 and to prevent any possible damage to the magnetic strip material 44 during its travel around the shaping or bending cam 272, the bending or shaping means 210 includes the endless, flexible belt 274 which is made from a suitable material, such as leather or plastic, and which has one end interposed between the outer surface of the shaping or bending cam 272 and the magnetic strip material 44 as it passes over said bending or shaping cam. The other end of the endless belt 274 passes over a suitable idler roll 314 which is supported by the bearing pin 312. In order that the endless belt 274 travel at substantially the same speed as the strip material 44 as both the belt and the strip material pass over the outer surface or face of the bending or shaping cam 272, the friction between the endless belt 274 and the strip material 44 is arranged to be greater than the friction between the endless belt 274 and the surface of the bending or shaping cam 272, which is preferably formed from a suitable material, having a higher coefficient of sliding friction, such as polished chrome.

In order to vary the tension in the endless belt 274 and to vary the friction between the endless belt 274 and the bending or shaping cam 272 and the strip material 44, the bearing pin 312 which supports the idler roll 314 is supported by a suitable supporting member 364, which in turn is supported by the bearing pin 368. The supporting member 364 includes a cylindrical portion 366, inside of which is disposed the bearing pin 368, and a projecting arm or member 362 having a recess 363 therein which is attached to the cylindrical portion 366 of the supporting member 364. The movable idler roll 314 is adapted to rotate about the bearing pin 312 while the supporting member 364 is adapted to rotate about the bearing pin 368. In order to bias the supporting member 364, as well as the idler roll 314 mounted thereon to rotate in a clockwise direction about the bearing pin 368, the adjusting knob 398 is threadedly mounted on one of the walls of the housing 310 with the inner end of the adjusting knob 398 bearing against the recess 363 of the projecting arm 362 of the supporting member 364. To increase the tension in the endless belt 274, the adjusting knob 398 is threadedly moved inwardly thereby tending to rotate the supporting member 364 and the idler roll 314 in a clockwise direction away from the shaping or bending cam 272. To decrease the tension in the endless belt 274, the adjusting knob 398 is moved outwardly in the opposite direction away from the projecting arm 362 of the supporting member 364.

Figure 8:
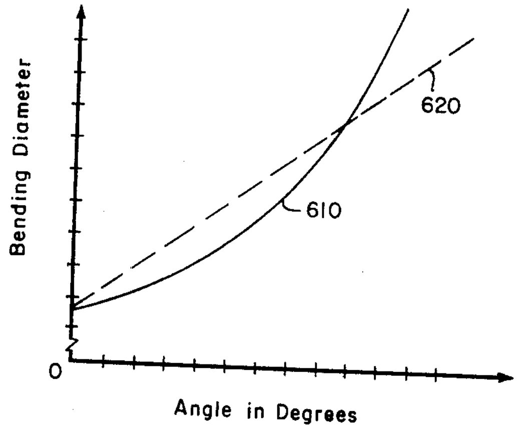
FIGS. 8 and 9 show curves which are explanatory of the operation of the apparatus shown in FIG. 1.

Referring to FIGS. 7 and 8, there is illustrated in FIG. 7 an enlarged view of the shaping or bending cam 272. It will be seen from FIG. 7, and as it has been found in practice, that the effective radius of the curvature or set introduced or imparted to the magnetic strip material 44 as it passes over the bending or shaping cam 272 varies with the point on the periphery on the shaping cam 272 at which the strip material 44 leaves the bending or shaping cam 272 due to the generally elliptical or oval shape of said cam. For example, if the strip material 44 leaves the shaping cam 272 at the point indicated at 570 in FIG. 7, the effective radius of the bending or curvature introduced into the magnetic strip material 44 by the shaping cam 272 is rather small, while if the magnetic strip material 44′ leaves the shaping cam 272 at the point on its periphery as indicated at 550, the effective radius of the curvature or set introduced into the strip material 44′ is relatively large compared to the first mentioned radius. In order to vary the effective radius of the curvature or set introduced into the strip material 44 by the shaping cam 272, the point at which the strip material 44 leaves the periphery of the shaping cam 272 may be varied during the winding of the core loop 172 by slowly rotating the bearing pin 342 since the shaping cam 272 is secured to and rotates with the bearing pin 342. The shaping cam 272 may be secured to the bearing pin 342 by any suitable means, such as the tapered pin 286 shown in FIG. 4. When the bearing pin 342 is rotated to thereby rotate the shaping cam 272, the axis of rotation of the shaping cam 272 is substantially coincident with the center of the bearing pin 342 as indicated at 540 in FIGS. 3 and 7. If a line drawn between the point 570 and the periphery of the shaping cam 272 and the central axis 540 is considered as a reference line, the variation in the effective radius of the curvature introduced by the shaping cam 272, depending upon the point at which the strip material 44 leaves its periphery, may be plotted as a function of the angle 530 between the reference line 510 and a line drawn between the central axis 540 and any other point on the periphery of the shaping cam 272, such as the point 550 for which the line 520 is drawn in FIG. 7.

The curve 610 shown in FIG. 8 illustrates the variation in the effective diameter or radius of the curvature or set introduced by the shaping cam 272 into the strip material 44 which is plotted on the vertical axis as a function of the angle 530 between the reference line 510 and a line drawn from the central axis 540 to the point at which said strip material leaves the shaping cam 272. The angle 530 may also be considered as a measure of the effective overlapping or contact of the strip material 44 with the outer surface of the cam 272 which may be covered of course, by the belt 274. In general, it will be seen from the curve 610 that the effective radius of the curvature or set introduced into the strip material 44 by the shaping cam 272 depends upon the point on the periphery of the shaping cam 272 at which the strip material 44 leaves the shaping cam 272. The point on the periphery of the shaping cam 272 at which the material 44 leaves said shaping cam may be varied, in turn, by slowly rotating the shaping cam 272 relative to the strip material 44 to thereby obtain a variation in the effective radius of curvature imparted by said shaping cam, as modified by the thickness of the belt 274, which approaches a substantially linear variation, as indicated by the straight line curve 620 in FIG. 8, for a particular range of operation.

The latter variation in the effective radius of the curvature introduced into the strip material 44 by the shaping cam 272 is particularly important in obtaining a core loop 172 in which the effective radius of curvature introduced into each turn of the core loop 172 varies substantially uniformly with the build-up of the turns of the strip material 44 on the mandrel 174. The advantage of the latter arrangement is that the different turns of the core loop 172 thus tend to spring inwardly towards the central axis of the core loop 172 and substantially eliminates the need for additional annealing of the core loop 172 in order to have the core loop 172 retain its generally ring-shaped configuration before further operations are performed in the manufacture of a finished wound magnetic core and facilitates such further operations on the core loop 172 as the subsequent cutting and forming of joints in the core loop 172 or the assembly with associated electrical windings to form an overall core and coil assembly.

In order to vary the effective radius of the curvature or set introduced into the magnetic strip material by the shaping cam 272 as the number of turns of the strip material 44 wound on the mandrel 174 increases or builds up during the winding of the core loop 172, the bending or shaping cam 272 is mechanically coupled to a follower roll 264 which rides on the outer periphery or surface of the core loop 172 and senses the build-up or increase in the number of turns of the magnetic strip material 44 wound on the mandrel 174 during the winding of the core loop 172. In general, the position of the shaping cam 272 is arranged initially so that the effective radius of curvature introduced into the strip material 44 is relatively quite small, as the first turns of the magnetic strip material 44 are wound on the mandrel 174, as best shown in FIG. 5, and then the shaping cam 272 is slowly rotated during the winding of the core loop 172 to gradually decrease the effective radius of curvature introduced into the strip material 44 as the number of turns wound on the mandrel 174 increases and the winding of the core loop 172 is completed.

In particular, the follower roll 264 is mounted at one end of a connecting arm 262 and is adapted to rotate in place about a pin which is secured in turn to the connecting arm 262. The other end of the connecting arm 262 is fixedly attached to a connecting pin 268 which, in turn, is fixedly attached to a crank arm which includes the lever arms 254 and 255, as best shown in FIG. 2. The connecting pin 268 is supported by a bracket member 257, which extends outwardly from the housing 310, and is adapted to rotate therein. As the number of turns of the strip material 44 increases or builds up on the mandrel 174 during the winding of the core loop 172, the follower roll 264 moves outwardly from the central axis of the core loop 172 to thus rotate the connecting arm 262 as well as the crank arm which includes the lever arms 254 and 255 in a clockwise direction. The double acting hydraulic cylinder 222, having a piston rod 224 pivotally connected to the outer end of the lever 255, as indicated at 226, operates during certain operating conditions to bias the crank arm, which includes the lever arms 254 and 255, as well as the connecting arm 262, in a counterclockwise direction to ensure that the follower roll 264 will bear against the outer periphery or circumference of the core loop 172 as the number of turns of the strip material increases during the winding of the core loop 172. During other operating conditions, the actuation of the hydraulic cylinder 222 may be reversed to cause the crank arm just described to rotate in a clockwise direction along with the connecting arm 262 to remove the follower roll 264 from its normal position in contact with the outer periphery of the core loop 172. The lever arm 254 of the crank arm includes a slot 252 arranged longitudinally thereof and is pivotally connected at the outer end of the slot 252 to the connecting arm 256. The other end of the connecting arm 256 is pivotally connected to the lever arm 244 by the slidable connector 246 whose position may be adjusted in the slot 242 of the lever arm 244 which is arranged longitudinally of said latter lever arm. The lever arm 244 is connected in turn to the shaft 232 by suitable means such as a bolted clamp, the shaft 232 being an extension of the bearing pin 342 on which the shaping or bending cam 272 is disposed and secured. The lever arm 244 therefore normally rotates with the bending or shaping cam 272 as the shaping cam 272 is slowly rotated in position during the winding of the core loop 172 when the number of turns of the strip material 44 builds up on the mandrel 174. The build-up is sensed by the movement of the follower roll 264 which is transmitted to the shaping cam 272 from the follower roll 264 through the mechanical linkage which includes the connecting arm 262, the lever arm 254, the connecting arm 256 and the lever arm 244 as just described. The desired variation in the position of the shaping cam 272, as well as the corresponding effective radius of curvature introduced into the strip material 44 by the shaping cam 272 with the build-up of the number of turns of said strip material on the mandrel 174, is therefore obtained. The mechanical linkage just described also operates as a mechanical amplifier which amplifies the movement of the follower roll 264 during the build-up of the core 172 in order to obtain the desired or necessary variation in the position of the shaping cam 272 as it is varied or controlled by the movement of the follower cam 264.

In order to vary the initial position of the shaping cam 272, as well as the corresponding effective initial radius of curvature introduced by the shaping cam 272 into the strip material 44, the bolted clamp connection between the lever arm 244 and the extending portion 232 of the bearing pin 342 to which the shaping cam 272 is attached, as indicated at 245, may be released and the bearing pin 342, as well as the shaping cam 272, may be manually rotated in place by means of the adjusting handle 233 which is mounted or attached to the top of the extending portion 232, as best shown in FIG. 2. The initial position of the shaping cam 272 may then be selected according to the position of the indicating pointer 236 which is also attached to the extending portion 232 of the bearing pin 342 and which indicates at all times the position of the shaping cam 272, as well as the effective radius of curvature which corresponds to the latter position on the calibrated dial 234 which is disposed on top of the housing 310.

In order to vary the rate of change of the position of the shaping cam 272 with the movement of the follower roll 264 or in order to vary the rate of change of the effective radius of curvature introduced by the shaping cam 272 into the strip material 44 with the build-up of the turns of said strip material on the mandrel 174, the position of the pivotal connection 246 between the lever arm 244 and the connecting arm 256 may be adjusted or varied in the slot portion 242 of the lever arm 244 or the position of the pivoted connection 258 in the slot portion 252 of the lever arm 254 may be varied. The latter adjustments in effect vary the gain of the mechanical linkage between the follower roll 264 and the shaping cam 272 considered as a mechanical amplifier.

Referring to FIG. 8, the initial adjustment of the position of the shaping cam 272 would vary the initial effective radius or diameter of curvature introduced into the strip material 44 by the shaping cam 272, as indicated by the curve 610, and the adjustments in the rate of change of the position of the shaping cam 272 would vary the rate of change of the effective radius of curvature introduced by the shaping cam 272, as indicated by the general shape or slope of the curve 610 in FIG. 8.

In summary, the bending means 210 operates to introduce or impart a curvature or set into each turn of the strip material 44 having an effective radius of curvature or bend radius which varies with the position of each turn of the strip material 44 in the core loop 172 as the strip material 44 is wound about the mandrel 174. Since the effective radius of curvature or set introduced into the strip material 44 varies with the build-up or increase in the number of turns of said strip material on the mandrel 174, each turn of the strip material 44 included in the core loop 172 tends to spring or move inwardly after the winding of the core loop 172 has been completed. The inwardly springing tendency of each turn of the core loop 172 which is generally ring-shaped or circular in configuration varies with the build up of the number of turns of the strip material 44 in the core loop 172 to produce a substantially uniform "springing-in" action of each of said turns which facilitates latter operations performed on the core loop 172 in the manufacture of a finished wound magnetic core, such as assembly with an associated preformed electrical winding. As mentioned previously, the effective radius of curvature introduced into each turn of the strip material 44 in the core loop 172 also serves to eliminate the requirement for annealing following the winding of the core loop 172 in order to have the core loop 172 retain its generally ring-shaped or circular configuration.

In order to perform an operation on the core loop 172, which will be described in detail hereinafter, following the initial winding of the core loop 172, the winding means 20 includes a clamping means 160 for limiting or restraining the outer diameter or peripheral dimension of the core loop 172 during the latter operation.

In particular, the clamping means 160 includes a stationary member 169 which is disposed to extend around approximately half of the periphery or circumference of the core loop 172 and which is supported by the frame portion 184 above the winding table 142 and a movable member 162 which extends around the other half of the periphery or circumference of the core loop 172 to form a closed loop around said core loop during certain operating conditions and which is pivotally connected at one end thereof, as indicated at 164, to the stationary member 169, as best shown in FIGS. 2, 5 and 6. One end of the stationary member 169, as indicated at 171, and the meeting end of the movable member 162, as indicated at 161, are adapted to form a releasable latching means which can be closed during certain operations of the apparatus 10 to form a restraining means which surrounds the core loop 172. In order to limit or restrain the outer diameter or circumference of the core loop 172 to substantially a predetermined value during certain operations of the apparatus 10, the stationary member 169 and the movable member 162 include the insert members 167 and 165, respectively, which are each semicircular in shape and the ends of which meet when the stationary member 169 and the movable member 162 are latched closed to form a restraining member or chuck having substantially a predetermined diameter which is determined by the inner diameter of the insert members 165 and 167 taken together. In order to facilitate the opening and closing of the clamping means 160 the movable member 162 includes an operating handle 163 which may be employed by the operator of the apparatus 10 to manually rotate the movable member 162 about the pivotal connection 164.

In order to facilitate the removal of the core loop 172 from the apparatus 10 following the completion of all necessary operations on said core loop, the apparatus 10 also includes the unloading means 170 as best shown in FIGS. 2, 5 and 6. In particular, the unloading means 170 is illustrated as including a double acting hydraulic cylinder 156 having disposed therein a piston rod 152 which may be actuated to move in either direction longitudinally of the associated hydraulic cylinder 156. The hydraulic cylinder 156 is supported by the frame portion 62 as shown in FIG. 2. The outer end of the piston rod 154 is secured or fastened by suitable means such as bolts to the unloading arm 152 which includes a curved surface 153. When the piston rod 154 of the unloading means 172 is actuated to move from right to left as shown in FIG. 2, the unloading arm 152 and more particularly, the curved surface 153 of said unloading arm bears against or pushes the finished core loop 172 from right to left also in FIG. 2 towards a suitable conveyor system (not shown) or other means adapted to receive the finished core loop. The unloading arm 152 may then be retracted by reversing the movement of the piston rod 154 in the hydraulic cylinder 156. It is to be understood that the clamping means 160 may be supported by the unloading arm 152 in certain applications.

Figure 9:
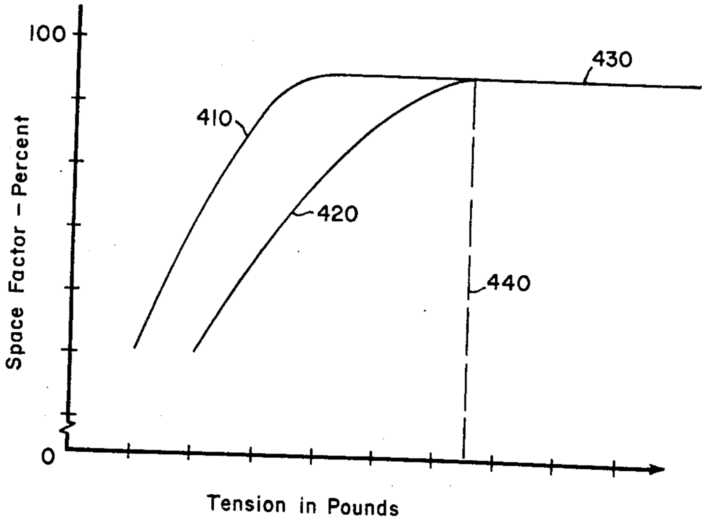

In order to obtain a substantially uniform space factor in the core loop 172 having substantially a predetermined value or percentage, it has been found that several important steps or operations must be performed in the manufacture or winding of the finished core loop 172. First, the tension in the strip material 44 during the winding of a plurality of turns of the strip material 44 in the core loop 172 must be maintained above substantially a predetermined value. If the latter operating requirement is met, it has been found that the space factor of the core loop 172 will then be substantially at a high predetermined value. Referring to FIG. 9, this is shown graphically by the curves 410 and 420 which indicate the space factor of the core loop 172 for different degrees of flatness or waviness of the strip material 44, as a function of the tension in the strip material 44 during the winding of the core loop 172. It will be seen from the curves 410 and 420 of FIG. 9 that if the tension in the strip material 44 is maintained above substantially a predetermined value, as indicated at 440 in FIG. 9, then the space factor of the core loop 172 will be substantially at the predetermined value or percentages indicated at 430 in FIG. 9, which is usually higher than desirable for later operations which may be performed on the core loop 172. In other words, if the strip material 44 is initially wound in a first predetermined direction about the mandrel 174 to form a core loop 172 having a first outer diameter or circumference while maintaining the tension in the strip material 44 above substantially a predetermined value, then the space factor of the initially wound core loop 172 will be substantially at a predetermined value as indicated at 430 in FIG. 9.

It is to be noted that the tension in the strip material 44 is determined by and can be varied by the difference between the braking torque applied to the strip material 44 by the braking means 60 of the strip feeding means 30 and the driving torque applied to the strip material 44 through the mandrel 174 by the driving means 140 in the winding means 20. It is important to note that the tension of the strip material 44 need not be regulated or maintained at substantially a predetermined value in order to obtain a core loop 172 having the space factor indicated at 430 in FIG. 9 so long as the tension in the strip material 44 is maintained above substantially the predetermined value indicated at 440 in FIG. 9.

Since the substantially uniform space factor which can be obtained in the core loop 172 by the operating means just described and, as indicated at 430 in FIG. 9, is higher than desirable for the later operations which may be performed on the core loop 172, it is usually desirable to provide means for reducing the space factor of the core loop 172 from the original or initial high value indicated at 430 in FIG. 9 to a substantially uniform space factor less than the uniform space factor which is initially obtained in the winding of the core loop 172. In order to obtain a substantially uniform space factor in the core loop 172 less than the high substantially uniform space factor indicated at 430 in FIG. 9, the strip material 44 is initially wound in a first predetermined direction about the mandrel 174 while maintaining the tension in said strip material above substantially a predetermined value as indicated at 440 in FIG. 9 until the outer diameter or circumference of the core loop 172 builds up or increases to substantially a first predetermined value which is less than the outer diameter or circumference of the core loop 176 ultimately desired or required in a particular application or design. The microswitch assembly 180 shown in FIGS. 5 and 6 may be provided adjacent to the mandrel 174 to sense the build-up of or increase in the turns of the strip material 44 to form the core loop 172 when the first outer diameter of said core loop is reached and to then actuate or control the operation of the driving means 140 through suitable control means (not shown) and to cause removal of the driving torque from the mandrel 174. At this stage, the core loop 172 will have a substantially high space factor, as indicated at 430 in FIG. 9 and, as previously discussed, and an outer diameter less than the final or ultimate outer diameter desired or required in the finished core loop 172. During the initial winding of the core 172 as just described, the clamping means 160 is left open or unlatched as best shown in FIG. 5. The outer turn of the strip material 44 which makes up the core loop 172 may be then cut or sheared as indicated at 45 in FIG. 6. The turns of the core loop 172 at this stage will remain in their wound positions because of the effective radius of curvature or set introduced into the strip material 44 during the winding of the core loop 172 by the bending means 210, as previously discussed.

The clamping means 160 is next latched or closed around the initially wound core loop 172 to establish a new or second outer diameter for the core loop 172 which is larger than the outer diameter of the core loop 172, as initially or originally wound. The mandrel 174 is then slowly rotated in a direction which is opposite to or reverse with respect to the first predetermined direction of the mandrel 174 during the initial winding of the core loop 172 as previously described until the outer diameter of the core loop 172 has increased to the second diameter. It has been found that the change in the outer diameter of the core loop 172 as effected by the operation just described to a new outer diameter as determined by the inner diameter of the insert members 165 and 167 of the clamping means 160 will uniformly reduce the space factor of the core loop 172 to substantially a predetermined value less than the substantially predetermined value of the space factor of the core loop 172 as initially or originally wound and as indicated at 430 in FIG. 9. In order to obtain a final core loop 172 having substantially a predetermined final outer diameter and substantially a uniform predetermined final space factor looseness, the required outer diameter of the core loop 172 after the initial winding may be calculated since the substantially uniform high space factor which is initially obtained is either known or can be controlled by the means previously described.

It is to be noted that the inner diameter of the core loop 172 which is established by the mandrel 174 changes only slightly or to a negligible degree during the latter operations. It has been found that a slight or negligible increase does result in the inner diameter of the core loop 172 during the second or reverse winding of the mandrel 174 which can be sensed by the microswitch assembly 190 which is disposed or provided on top of the upper flange portion 176 of the mandrel 175 and which may serve to actuate or control the operation of the driving means 140 through suitable control means (not shown) to remove the driving torque from the mandrel 174 following or at the end of the second or reverse winding operation just described. The latter change in the inner diameter of the core loop 172 also permits the core loop 172 to slip off the mandrel 174 when the handle 178 is released and the winding table 142 is lowered by the hydraulic means 150. The clamping means 160 may then be opened or unlatched and the unloading means 170 actuated to push the finished core loop 172 to an associated conveyor system (not shown), as previously described.

In summary, the apparatus 10 includes means for producing a core loop 172 having a substantially uniform space factor. The core loop 172 is initially wound in a first predetermined direction while maintaining the tension in the strip material 44 above substantially a predetermined value and until the outer diameter of the core loop 172 reaches a first predetermined value. The space factor of the core loop 172 as initially wound is substantially uniform at substantially a predetermined value, as indicated at 430 in FIG. 9. The mandrel 174 is then rotated slowly in a direction opposite to the first winding direction until the outer diameter of the core loop 172 has increased to a second predetermined value thus reducing the substantially uniform space factor to a second predetermined value and uniformly distributing the looseness through the turns of the core loop 172.

The overall operation of the apparatus or machine 10 will now be described. The strip feeding or supply means 30 supplies a continuous ribbon of the strip material 44 which is wound on the mandrel 174 by the winding means 20 to form a closed magnetic core loop having a generally ring-shaped or hollow cylindrical configuration as previously discussed in greater detail. The winding means 20 includes means for guiding the strip material 44 to the mandrel 174 as well as deburring means for removing burrs from the edges of the strip material 44 before said strip material reaches the mandrel 174. The winding 20 also includes the bending or shaping means 210 for introducing or imparting a set or curvature to the strip material 44 before said strip material reaches the mandrel 174 and which varies with the build-up or increase in the number of turns of the strip material 44 during the winding of the core loop 172.

Before the winding of the core loop 172 is started, the free end of the strip material 44 is secured to the mandrel 174, as previously described. Next, the driving means 140 applies a driving torque to the shaft 138 of the mandrel 174 causing the mandrel 174 to rotate in a first predetermined direction until the number of turns of the strip material 44 builds up on the mandrel 174 and the core loop 172 reaches a predetermined outer diameter. During the initial winding of the core loop 172, the driving means 140 cooperates with the braking means 60 of the strip feeding means 30 to maintain the tension in the strip material 44 above substantially a predetermined value so that the space factor of the initially wound core loop 172 is substantially uniform and at substantially a predetermined value, as indicated at 430 in FIG. 9. During the initial winding of the core loop 172, the bending means 210 has also introduced a curvature or set having a radius which varies with the build-up or increase in the number of turns of the strip material 44 on the mandrel 174 as previously described in order that the core loop 172 will retain its shape following the winding of said core loop. The outer turn of the core loop 172 is then cut or sheared, as indicated at 45 in FIG. 6, and the clamping means 160 is closed or latched around the initially wound core loop 172. The driving means 140 is then actuated to rotate the mandrel 174 slowly in a direction which is opposite to the first predetermined direction of rotation of said mandrel until the outer diameter of the core loop 172 reaches a new larger outer diameter which is determined by the inner diameter of the insert members 165 and 167 of the clamping means 160 to thereby reduce the substantially uniform space factor of the core loop 172 to a substantially uniform space factor which is less than the space factor of the core loop 172 as initially wound. The clamping means 160 is then opened or unlatched and the winding table 142 is lowered from the position shown in FIG. 1, thus slipping the core loop 172 off the mandrel 174. The innermost turn of the core loop 172 may be released by the handle 178 either before or after the core loop 172 is released or slipped off the mandrel 174. The unloading means 170 may then be employed to push the finished core loop 172 off the winding table 142 in a substantially frictionless manner as permitted by the rolls 144 which are embedded in the winding table 142 and which prevent any damage to the lower edge of the strip material 44 as it is wound about the mandrel 174 during the winding of said strip material in a first predetermined direction or during the reverse winding of said strip material as previously described.

It is to be understood that the driving means 140 may be disposed below the winding table 142 in a particular application with the driving shaft 138 arranged to pass through an opening in the winding table 142 to support a suitable rotatable member, such as the mandrel 174. It is also to be understood that the bending means 210 may be employed in other types of core winding machines or apparatus in which the wound magnetic core is disposed in an arrangement with a vertical axis as illustrated or in which the axis of the wound magnetic core is in a horizontal plane. It is also to be understood that in certain applications, the machine 10 may omit the bending means 210 as disclosed in order to produce a wound magnetic core having a substantially uniform space factor and which may be subsequently annealed in order that the wound magnetic core thus produced will retain its generally ring-shaped or hollow cylindrical configuration.

It is to be noted that a method has been disclosed for producing or making a wound type magnetic core having a substantially uniform space factor without requiring the regulation or control of the tension in the magnetic strip material from which the magnetic core is formed at substantially a predetermined value. In particular, the latter method of producing a wound type magnetic core having a substantially uniform space factor or looseness of substantially a predetermined value or percentage comprises the steps of winding a plurality of turns of magnetic strip material, such as the strip material 44, in a first predetermined direction on a rotatable member, such as the mandrel 174, to form a closed core loop having a generally ring-shaped or hollow cylindrical configuration while maintaining the tension in said strip material above substantially a predetermined value and then rotating the rotatable member such as the mandrel 174 in a direction which is opposite to the first predetermined direction while limiting the outside diameter of the core to substantially a predetermined value larger than the outer diameter of said core as initially or originally wound by suitable means, such as the clamping means 160, as disclosed. In addition, the latter method may include cutting or shearing the strip material at the end of the outermost turn of the strip material which forms the closed magnetic core loop, such as the core loop 172.

A second method has also been disclosed for making or producing a wound type magnetic core from magnetic strip material which retains its generally ring-shaped or hollow cylindrical configuration without requiring annealing before further operations are performed on said wound type core. In particular, the second method comprises the steps of drawing or passing magnetic strip material over a generally curved member, more specifically, a generally elliptically-shaped or oval-shaped member, such as the shaping or bending cam 272, to impart or introduce a predetermined set or curvature having a predetermined bend radius in said strip material at each point along said strip material and then winding a plurality of turns of the strip material such as the strip material 44 to form a generally ring-shaped, closed core loop, the bend radius of said set or curvature at each point along said strip material varying continuously with the increasing diameter or build-up of the turns of said strip material which make up the wound type core in a predetermined manner which is preferably substantially linear or uniform over the build-up of said wound type core.

In addition, either of the above methods may include a further step such as shaping the wound core to a predetermined shape having a yoke and legs and then finally annealing the wound core to relieve the stresses introduced during the previous winding or shaping operations. It is to be understood that either of the above methods may be employed separately or that the methods may be combined in a single overall process for producing wound magnetic cores of the type described.

It is to be noted that in at least one embodiment of the wound magnetic core of the type described, including a plurality of turns of magnetic strip material wound in a magnetic core having a generally ring-shaped or hollow cylindrical configuration, each of the turns of magnetic strip material included in said wound core has a bend radius of curvature or set introduced during the winding so that each of said turns tends to spring or move inwardly in a substantially uniform manner as previously disclosed.

The aparatus and methods as well as the product resulting therefrom embodying the teachings of this invention has several important advantages. For example, a wound type magnetic core can be produced having a generally ring-shaped or hollow cylindrical configuration which does not require annealing following the winding of said core in order to have said core retain its generally ring-shaped or hollow cylindrical configuration before further operations are perfomed on said wound core. In addition, a wound type magnetic core can be produced having a substantially uniform space factor without requiring precise control or regulation of the tension in a strip material from which said core is formed during the winding of said core as is required in many types of conventional apparatus and methods which are employed to produce a magnetic core of the same general type.

Since numerous changes may be made in carrying out the above method and in the product, the modifications effected in the apparatus for practicing the principles thereof, without departing from the spirit and scope of the invention, is intended that all matter contained in the above description or shown in the accompanying drawings shall be interpreted as illustrative and not in a limiting sense.

We claim as our invention:

A magnetic core loop comprising, a plurality of continuously contiguous superposed turns of magnetic strip material formed from a continuous strip of magnetic material, said magnetic core loop having a generally ring-shaped configuration, each of said plurality of turns having a first predetermined radius in said magnetic core loop, the magnitudes of the first predetermined radii of each of said plurality of turns increasing from the inner turn to the outer turn of said magnetic core loop in a substantially uniform manner, each of said plurality of turns having a predetermined set which would cause each of said turns to assume a second predetermined radius smaller in magnitude than its first predetermined radius if unrestrained, the magnitudes of the second predetermined radii of each of said plurality of turns increasing from the inner turn to the outer turn of said magnetic core loop in a substantially uniform manner, the set in each of said plurality of turns enabling said magnetic core loop to retain its ring-shaped configuration.

References Cited by the Examiner

UNITED STATES PATENTS

| | | | |
|---|---|---|---|
| 2,260,398 | 10/41 | Otte | 336—213 |
| 2,265,246 | 12/41 | Ott | 242—78 |
| 2,595,755 | 5/52 | Bedford | 336—213 X |
| 3,010,074 | 11/61 | Kiesling | 336—20 X |

FOREIGN PATENTS

| | | |
|---|---|---|
| 388,183 | 2/33 | Great Britain. |

LARAMIE E. ASKIN, *Primary Examiner.*

JOHN F. BURNS, *Examiner.*